United States Patent
Kazmi et al.

(10) Patent No.: US 11,997,632 B2
(45) Date of Patent: May 28, 2024

(54) METHODS FOR AUTONOMOUS TIMING ADJUSTMENT UNDER HIGH SPEED SCENARIO

(71) Applicant: Telefonaktiebolaget LM Ericsson (publ), Stockholm (SE)

(72) Inventors: Muhammad Ali Kazmi, Sundbyberg (SE); Christopher Callender, Kinross (GB); Magnus Sandgren, Staffanstorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 91 days.

(21) Appl. No.: 17/600,681

(22) PCT Filed: Mar. 30, 2020

(86) PCT No.: PCT/SE2020/050326
§ 371 (c)(1),
(2) Date: Oct. 1, 2021

(87) PCT Pub. No.: WO2020/204792
PCT Pub. Date: Oct. 8, 2020

(65) Prior Publication Data
US 2022/0182958 A1 Jun. 9, 2022

Related U.S. Application Data

(60) Provisional application No. 62/827,437, filed on Apr. 1, 2019.

(51) Int. Cl.
*H04W 56/00* (2009.01)

(52) U.S. Cl.
CPC .............................. *H04W 56/0045* (2013.01)

(58) Field of Classification Search
CPC ......... H04W 56/0045; H04W 56/0005; H04W 72/0453; H04W 24/02; H04W 56/00;
(Continued)

(56) References Cited

U.S. PATENT DOCUMENTS

2002/0126706 A1* 9/2002 Laroia ............... H04W 56/0005
370/503
2010/0020786 A1* 1/2010 Futaki ............... H04W 56/0055
370/350

(Continued)

FOREIGN PATENT DOCUMENTS

| EP | 3573364 A1 | 11/2019 |
|---|---|---|
| WO | 2019029646 A1 | 2/2019 |
| WO | 2019032835 A1 | 2/2019 |

OTHER PUBLICATIONS

International Search Report and Written Opinion dated Jul. 6, 2020 for International Application No. PCT/SE2020/050326 filed Mar. 20, 2020, consisting of 13-pages.

(Continued)

*Primary Examiner* — Nathan S Taylor
(74) *Attorney, Agent, or Firm* — Weisberg I.P. Law. P.A.

(57) ABSTRACT

According to one aspect of the disclosure, a wireless device is configured to communicate with a network node is provided. The wireless device includes processing circuitry configured to: receive an indication, adjust a transmit timing based at least on the indication, and optionally transmit signals based at least on the adjusted transmit timing.

20 Claims, 9 Drawing Sheets

(58) Field of Classification Search
CPC .. H04W 72/04; H04L 27/2607; H04L 5/0094; H04L 27/26; H04L 5/00
See application file for complete search history.

(56) References Cited

U.S. PATENT DOCUMENTS

| | | | | |
|---|---|---|---|---|
| 2010/0210301 A1* | 8/2010 | Dietz | ................ | H04W 52/0254 340/670 |
| 2010/0303042 A1* | 12/2010 | Bergman | .......... | H04W 56/0045 370/335 |
| 2012/0064931 A1* | 3/2012 | Hamada | ............ | H04W 56/0045 455/509 |
| 2013/0170415 A1* | 7/2013 | Fukuta | .............. | H04W 52/0216 370/311 |
| 2014/0086219 A1* | 3/2014 | Suzuki | .............. | H04W 56/0005 370/336 |
| 2015/0003427 A1* | 1/2015 | Wan | .................. | H04W 56/0005 370/336 |
| 2015/0085839 A1* | 3/2015 | Bergstrom | ........ | H04W 56/0045 370/336 |
| 2015/0189610 A1* | 7/2015 | Siomina | .................... | H04L 5/14 370/280 |
| 2017/0367058 A1* | 12/2017 | Pelletier | ............ | H04W 72/0446 |
| 2018/0027555 A1* | 1/2018 | Kim | ...................... | H04W 72/23 370/329 |
| 2018/0042039 A1* | 2/2018 | Senba | ...................... | H04W 4/40 |
| 2018/0199300 A1* | 7/2018 | Bergström | ........ | H04W 74/0891 |
| 2018/0206246 A1* | 7/2018 | Zhang | .................. | H04L 1/1896 |
| 2019/0053228 A1* | 2/2019 | Akkarakaran | .... | H04W 72/0446 |
| 2019/0159149 A1* | 5/2019 | Ryu | .................. | H04W 56/0045 |
| 2019/0199384 A1* | 6/2019 | Pekoz | ............... | H04L 27/26412 |
| 2019/0223178 A1* | 7/2019 | Bergström | ........ | H04W 72/0446 |
| 2019/0320467 A1* | 10/2019 | Freda | .................. | H04W 74/004 |
| 2020/0029293 A1* | 1/2020 | Zhang | .................. | H04L 5/0094 |
| 2021/0029658 A1* | 1/2021 | Mahalingam | ..... | H04W 56/0045 |
| 2021/0084606 A1* | 3/2021 | Abedini | ............ | H04W 56/0025 |
| 2021/0219316 A1* | 7/2021 | Schmitt | ............ | H04W 72/1268 |
| 2022/0159741 A1* | 5/2022 | Hoang | ............. | H04W 72/0453 |
| 2022/0191812 A1* | 6/2022 | Li | ..................... | H04W 56/0045 |

OTHER PUBLICATIONS

European Communication dated Mar. 22, 2023 for Application No. 20717341.0 consisting of 5 pages.

* cited by examiner

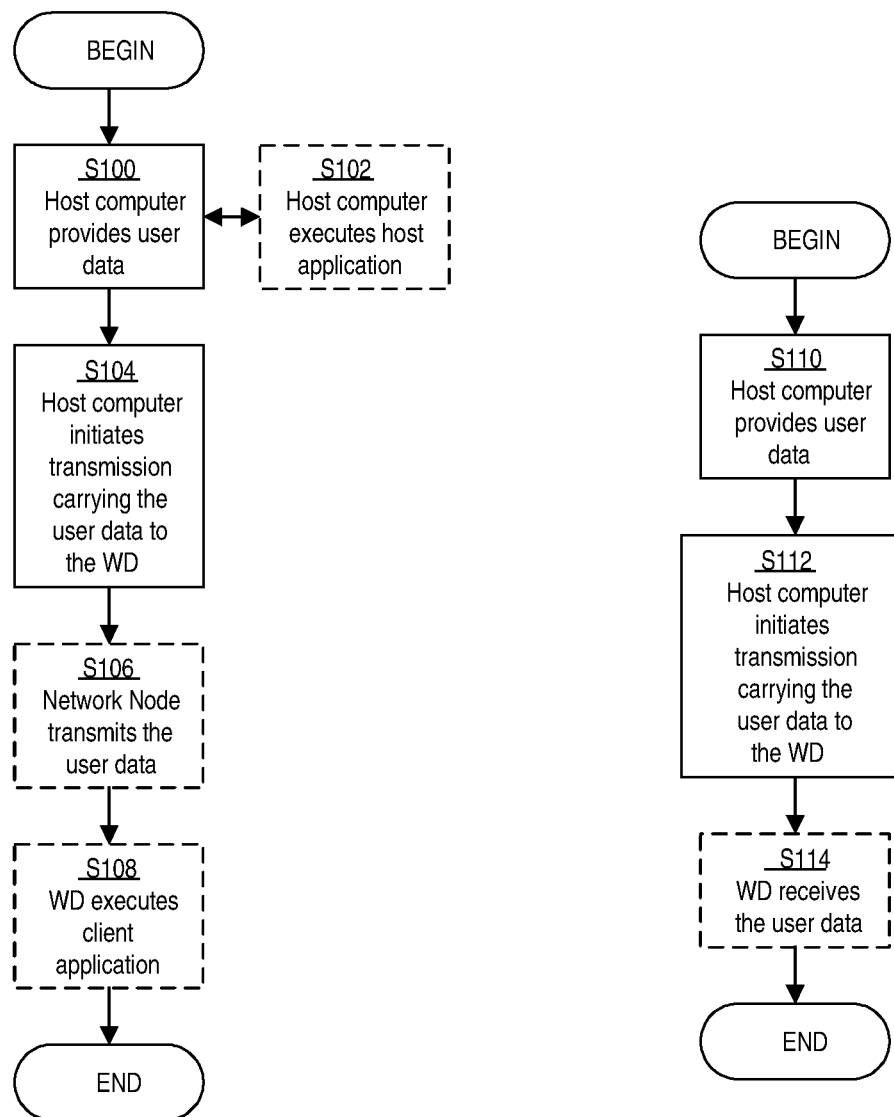

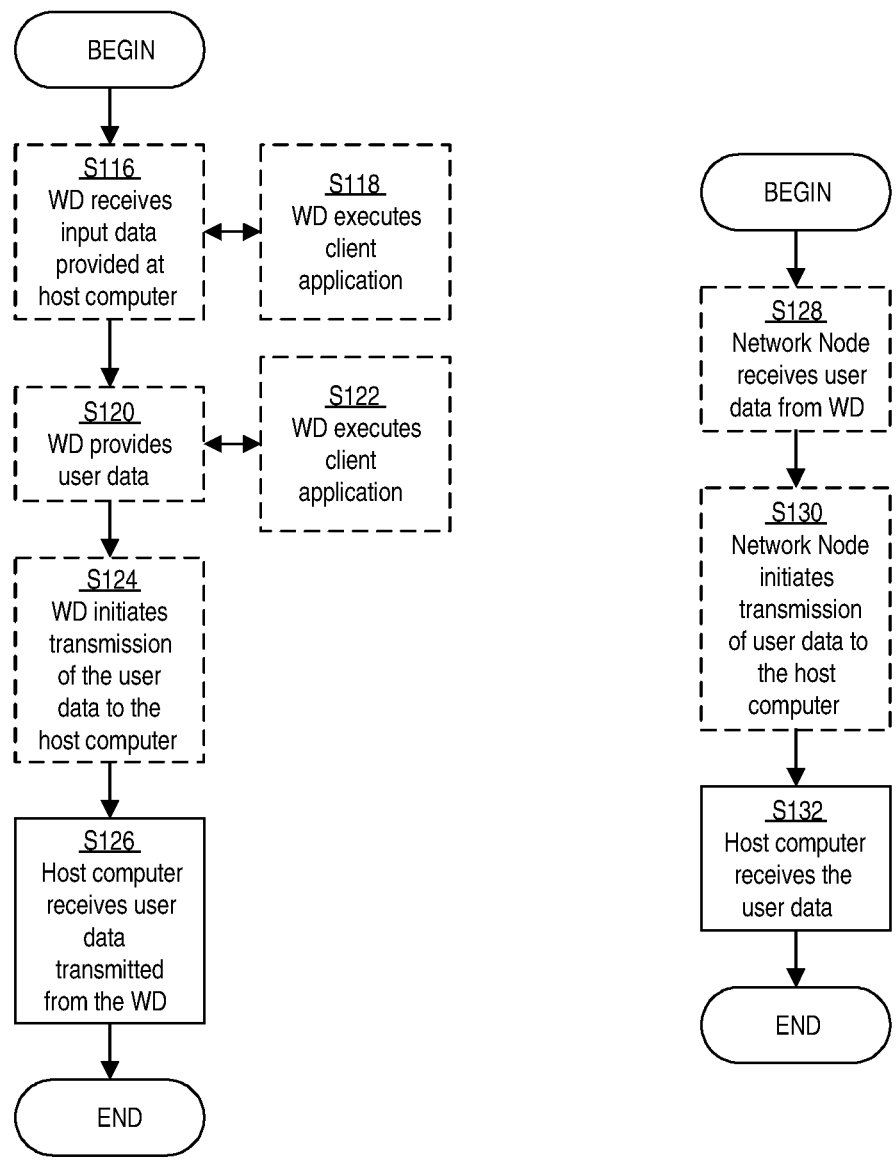

METHODS FOR AUTONOMOUS TIMING ADJUSTMENT UNDER HIGH SPEED SCENARIO

CROSS-REFERENCE TO RELATED APPLICATIONS

This application is a Submission Under 35 U.S.C. § 371 for U.S. National Stage Patent Application of International Application No.: PCT/SE2020/050326, filed Mar. 30, 2020 entitled "METHODS FOR AUTONOMOUS TIMING ADJUSTMENT UNDER HIGH SPEED SCENARIO," which claims priority to U.S. Provisional Application No. 62/827,437, filed Apr. 1, 2019, entitled "METHODS FOR AUTONOMOUS TIMING ADUSTMENT UNDER HIGH SPEED SCENARIO," the entireties of both of which are incorporated herein by reference.

TECHNICAL FIELD

The present disclosure relates to wireless communications, and in particular, to transmit timing adjustments of a wireless device within a cell.

BACKGROUND

Wireless Device Autonomous Timing Adjustment Based on Downlink Reception Timing In some wireless communication networks, the uplink (UL) timing advance is maintained by the serving network node (e.g., eNodeB, gNodeB, base station, etc.) through timing alignment or timing advance (TA) commands sent to the wireless device. The TA can be estimated based on measurements on UL transmissions from that wireless device, e.g., on RACH. This is also referred to as a network controlled or network node controlled wireless device (WD) transmit timing.

In addition to the timing advance (TA) based adjustment of the UL transmit timing, there is also a pre-defined requirement on the wireless device to autonomously adjust its UL timing in response to the drift in the downlink (DL) transmit timing of the reference cell, which is also the serving cell. The uplink/downlink timing relation is illustrated in FIG. 1. More specifically the wireless device may be required to follow the change in the frame transmit timing of the DL reference cell (e.g., serving cell) and correspondingly adjusts its (WD's) transmit timing for uplink transmission of signals. The WD typically uses some sort of reference signals to track the downlink timing of the serving cell, e.g., common reference signal in Long Term Evolution (LTE), synchronization signals, Synchronization Signal Block (SSB) in New Ratio (NR, as referred to as 5$^{th}$ Generation (5G)), etc.

The relation between the uplink and downlink transmission timing is described below. In LTE the transmission of the uplink radio frame number i from the WD may start $(N_{TA}+N_{TA\ offset}) \times T_s$ seconds before the start of the corresponding downlink radio frame at the WD, where $0 \leq N_{TA} \leq 4096$ if the WD is configured with a Secondary Cell Group (SCG) and $0 \leq N_{TA} \leq 20512$ otherwise. For frame structure type 1 $N_{TA\ offset}=0$ and for frame structure type 2 $N_{TA\ offset}=624$.

The receive UL timing in the network node from all WDs transmitting uplink dedicated signals in the cell, independent of the distance to the network node, may reach the network node in approximately the same time in order for the network node to demodulate the signals from all the WDs in the same receiver FFT process. The UL timing from the WD is therefore controlled by the network node with the TA (Time Adjustment) command, which signals the parameter $N_{TA}$ to the WD. This parameter is signaled to a WD in the connected mode in MAC command and has a granularity of about 0.5 μs per step e.g. each step is 16 Ts where 1 Ts=1/(15000*2048) seconds=32.55 ns (basic time unit). In NR similar time relation is used except that the TA step scales with SCS (e.g., Service Capability Server). In NR the basic time unit is called, Tc, where 1 Tc=Ts/64.

The autonomous timing adjustment is applied by the WD for transmitting uplink signals when the WD does not have a valid timing advance adjustment command. The WD also applies autonomous timing adjustment for initial transmission of signals, e.g., random access transmission. The WD also applies autonomous timing adjustment for first uplink transmission of signals in Discontinuous Reception (DRX) or after long inactivity, e.g., upon expiration of time alignment (TAT) timer making the TA command invalid.

The serving cell DL transmit timing may change due to different reasons, e.g., due to variation in radio conditions, imperfection in clocks, maintenance activities, deliberate attempt by the network/network node to change timing, etc. When the magnitude of the timing error in the WD transmit timing exceeds a certain/predefined threshold (Te) then WD may be required to adjust its UL transmit timing in smaller steps by following certain rules. For example, in this case, the WD changes its timing (increase or decrease) at a certain rate. This is to ensure that the WD does not change its UL timing too quickly. This requirement may stem from the problem that, if the WD changes its timing in the order of several μs from subframe to subframe, the network node receiver may not be able to cope with sudden or abrupt change in the timing of the received signals from the WD. For example, the signals may fall outside the CP length (e.g., 4.7 μs for normal CP with 15 kHz SCS) of the symbol or may spread across large part of the CP. This may result in degradation of demodulation of signals received at the network node from the WD. The CP length is about 4.7 μs for normal CP with 15 kHz SCS. Examples of such rules are described below:

All autonomous timing adjustments made to the UE uplink timing follow some rules. For example:
  The maximum amount of the magnitude of the timing change in one adjustment is Tq seconds.
  The minimum aggregate adjustment rate is 7*Ts per second.
  The maximum aggregate adjustment rate is Tq per 200 ms.

Where Ts=32.55 ns and Tq depends on bandwidth of DL reference cell. Example of Tq=3.5 Ts for a DL BW of 10 MHz or larger.

Numerologies

The term "numerology" may include but is not limited to, e.g., the following elements: frame duration, subframe or transmission time interval (TTI) duration, slot duration, mini-slot, subcarrier spacing (SCS), cyclic prefix (CP) length, number of subcarriers per resource block (RB), number of RBs within the bandwidth (different numerologies may result in different numbers of RBs within the same bandwidth).

In the LTE downlink, which is orthogonal frequency-division multiplexing (OFDM)-based, the subcarrier spacing is 15 kHz for normal CP and 15 kHz and 7.5 kHz (i.e., the reduced carrier spacing) for extended CP, where the latter may be allowed only for Multimedia Broadcast Multicast Services (MBMS)-dedicated carriers.

In NR which is to be based on OFDM, multiple numerologies are supported for general operation. A scaling approach (based on a scaling factor $2^n$, n=1, 2, ...) is considered for deriving subcarrier spacing candidates for NR: 15 kHz, 30 kHz, 60 kHz, 120 kHz, 240 kHz etc.

In one or more existing systems, the WD may be required to use the same transmit timing adjustment parameters regardless of the WD speed and also regardless of the cell configuration parameters. The WD is expected to operate up to very high speed e.g. up to 500 km/hour, which may further be increased in future releases. In both LTE and NR, the WD can be configured to operate in one of the plurality of bandwidths, e.g., from 1.4 MHz to 20 MHz in LTE, and from 5 MHz to 400 MHz in NR. However, existing approaches in existing systems for adjusting the WD transmit timing are suboptimal. They may severely degrade the reception quality of the received signals at the network node serving the WD.

SUMMARY

Some embodiments advantageously provide methods, systems, and apparatuses for transmit timing adjustments based at least in part on at least one operating characteristic of a wireless device within a cell.

In one or more embodiments of the disclosure includes one or more methods in a WD and a network node where the autonomous transmit timing adjustment is applied to the uplink transmitted signals by the WD depending on at least the UE speed (V) and the operating bandwidth (BW), for example.

According to one or more embodiments, a WD served by a first cell (cell1) obtains information about its WD speed, determines an operating bandwidth and based on the information about its speed and the operating bandwidth determines at least one timing adjustment related parameter, and uses the determined timing adjustment related parameter for adjusting its uplink transmit timing for transmitting signals in cell1.

According to one or more embodiments, a network node determines a speed of a WD and an operating bandwidth for the WD served by a first cell (cell1) and based on the information about the WD speed and the operating bandwidth determines at least one parameter associated with a high-speed indicator (HSI) and transmits information related to the HSI to the WD.

According to one aspect of the disclosure, a wireless device is configured to communicate with a network node is provided. The wireless device includes processing circuitry configured to: receive an indication, adjust a transmit timing based at least on the indication, and optionally transmit signals based at least on the adjusted transmit timing.

According to one or more embodiments of this aspect, the indication is provided by an indicator that includes at least one indicator parameter where the at least one indicator parameter indicates one of a plurality of operational schemes for the wireless device to implement. According to one or more embodiments of this aspect, the adjusting of the transmit time includes switching from a first operational scheme to a second operational scheme where each operational scheme defines a plurality of respective values for a plurality of transmit timing parameters. According to one or more embodiments of this aspect, the first operational scheme is configured to be used by the wireless device in the absence of reception of the indication.

According to one or more embodiments of this aspect, the plurality of transmit timing parameters includes at least one of a maximum magnitude of a timing adjustment step, a minimum aggregate transmit timing adjustment rate and a maximum aggregated timing adjustment. According to one or more embodiments of this aspect, the indication is broadcast within a cell. According to one or more embodiments of this aspect, the indication indicates that the wireless device is associated with one of a plurality of speed ranges where each speed range is associated with a respective operational scheme.

According to one or more embodiments of this aspect, the indication is not provided by a timing advance command. According to one or more embodiments of this aspect, the indication is based at least on an estimated speed of the wireless device where the estimated speed of the wireless device is based at least on at least one of a geographical area where the wireless device is located, and historical speed data of the wireless device. According to one or more embodiments of this aspect, the indication is based on at least one of a bandwidth associated with a cell serving the wireless device, a subcarrier spacing associated with a cell serving the wireless device and a numerology associated with a cell serving the wireless device. According to one or more embodiments of this aspect, the bandwidth is one of a bandwidth of the cell, a bandwidth part associated with the wireless device and a bandwidth of a reference signal.

According to another aspect of the disclosure, a method implemented by a wireless device that is configured to communicate with a network node is provided. An indication is received. A transmit timing is adjusted based at least on the indication. Signals are optionally transmitted based at least on the adjusted transmit timing. According to one or more embodiments of this aspect, the indication is provided by an indicator that includes at least one indicator parameter where the at least one indicator parameter indicates one of a plurality of operational schemes for the wireless device to implement. According to one or more embodiments of this aspect, the adjusting of the transmit time includes switching from a first operational scheme to a second operational scheme where each operational scheme defines a plurality of respective values for a plurality of transmit timing parameters.

According to one or more embodiments of this aspect, the first operational scheme is configured to be used by the wireless device in the absence of reception of the indication. According to one or more embodiments of this aspect, the plurality of transmit timing parameters includes at least one of a maximum magnitude of a timing adjustment step, a minimum aggregate transmit timing adjustment rate and a maximum aggregated timing adjustment. According to one or more embodiments of this aspect, the indication is broadcast within a cell.

According to one or more embodiments of this aspect, the indication indicates that the wireless device is associated with one of a plurality of speed ranges where each speed range is associated with a respective operational scheme. According to one or more embodiments of this aspect, the indication is not provided by a timing advance command. According to one or more embodiments of this aspect, the indication is based at least on an estimated speed of the wireless device where the estimated speed of the wireless device is based at least on at least one of: a geographical area where the wireless device is located, and historical speed data of the wireless device.

According to one or more embodiments of this aspect, the indication is based on at least one of a bandwidth associated with a cell serving the wireless device, a subcarrier spacing associated with a cell serving the wireless device and a numerology associated with a cell serving the wireless device. According to one or more embodiments of this aspect, the bandwidth is one of a bandwidth of the cell, a bandwidth part associated with the wireless device and a bandwidth of a reference signal.

According to another aspect of the disclosure, a network node configured to communicate with a wireless device is provided. The network node includes processing circuitry configured to: signal an indication to the wireless device where the indication configured to cause the wireless device to adjust a transmit timing, and optionally receive signals based at least on the adjusted transmit timing.

According to one or more embodiments of this aspect, the indication is provided by an indicator that includes at least one indicator parameter where the at least one indicator parameter indicates one of a plurality of operational schemes for the wireless device to implement. According to one or more embodiments of this aspect, the adjusting of the transmit timing includes switching from a first operational scheme to a second operational scheme where each operational scheme defines a plurality of respective values for a plurality of transmit timing parameters. According to one or more embodiments of this aspect, the first operational scheme is configured to be used by the wireless device in the absence of transmission of the indication.

According to one or more embodiments of this aspect, the plurality of transmit timing parameters includes at least one of a maximum magnitude of a timing adjustment step, a minimum aggregate transmit timing adjustment rate and a maximum aggregated timing adjustment. According to one or more embodiments of this aspect, the indication is broadcast within a cell. According to one or more embodiments of this aspect, the processing circuitry is further configured to determine one of a plurality of speed ranges associated with the wireless device where each speed range is associated with a respective operational scheme for the wireless device, and the indication is based at least on the determined one of the plurality of speed ranges.

According to one or more embodiments of this aspect, the indication is not provided by a timing advance command. According to one or more embodiments of this aspect, the processing circuitry is further configured to estimate a speed of the wireless device based at least on at least one of a geographical area where the wireless device is located and historical speed data of the wireless device. The indication is based at least on the estimated speed of the wireless device. According to one or more embodiments of this aspect, the processing circuitry is further configured to determine at least one of a bandwidth associated with a cell serving the wireless device, a subcarrier spacing associated with a cell serving the wireless device and a numerology associated with a cell serving the wireless device. The indication is based at least in part on the determined at least one of bandwidth, subcarrier spacing and numerology. According to one or more embodiments of this aspect, the determined bandwidth is one of a bandwidth of the cell, a bandwidth part associated with the wireless device and a bandwidth of a reference signal.

According to another aspect of the disclosure, a method implemented by a network node that is configured to communicate with a wireless device is provided. An indication is signaled to the wireless device where the indication is configured to cause the wireless device to adjust a transmit timing. Signals are optionally received based at least on the adjusted transmit timing.

According to one or more embodiments of this aspect, the indication is provided by an indicator that includes at least one indicator parameter, the at least one indicator parameter indicating one of a plurality of operational schemes for the wireless device to implement. According to one or more embodiments of this aspect, the adjusting of the transmit timing includes switching from a first operational scheme to a second operational scheme, each operational scheme defining a plurality of respective values for a plurality of transmit timing parameters. According to one or more embodiments of this aspect, the first operational scheme is configured to be used by the wireless device in the absence of transmission of the indication.

According to one or more embodiments of this aspect, the plurality of transmit timing parameters includes at least one of a maximum magnitude of a timing adjustment step, a minimum aggregate transmit timing adjustment rate and a maximum aggregated timing adjustment. According to one or more embodiments of this aspect, the indication is broadcast within a cell. According to one or more embodiments of this aspect, one of a plurality of speed ranges associated with the wireless device is determined where each speed range is associated with a respective operational scheme for the wireless device. The indication is based at least on the determined one of the plurality of speed ranges.

According to one or more embodiments of this aspect, the indication is not provided by a timing advance command. According to one or more embodiments of this aspect, a speed of the wireless device is estimated based at least on at least one of: a geographical area where the wireless device is located, historical speed data of the wireless device, and the indication is based at least on the estimated speed of the wireless device. According to one or more embodiments of this aspect, at least one of a bandwidth associated with a cell serving, a subcarrier spacing associated with a cell serving the wireless device and a numerology associated with a cell serving the wireless device are determined. The indication is based at least in part on the determined at least one of bandwidth, subcarrier spacing and numerology. According to one or more embodiments of this aspect, the determined bandwidth is one of a bandwidth of the cell, a bandwidth part associated with the wireless device and a bandwidth of a reference signal.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating exemplary methods implemented in a communication system including a host computer, a network node and a wireless device for executing a client application at a wireless device according to some embodiments of the present disclosure;

FIG. 5 is a flowchart illustrating exemplary methods implemented in a communication system including a host computer, a network node and a wireless device for receiving user data at a wireless device according to some embodiments of the present disclosure;

FIG. 6 is a flowchart illustrating exemplary methods implemented in a communication system including a host computer, a network node and a wireless device for receiving user data from the wireless device at a host computer according to some embodiments of the present disclosure;

FIG. 7 is a flowchart illustrating exemplary methods implemented in a communication system including a host computer, a network node and a wireless device for receiving user data at a host computer according to some embodiments of the present disclosure;

DETAILED DESCRIPTION

Figure 1:
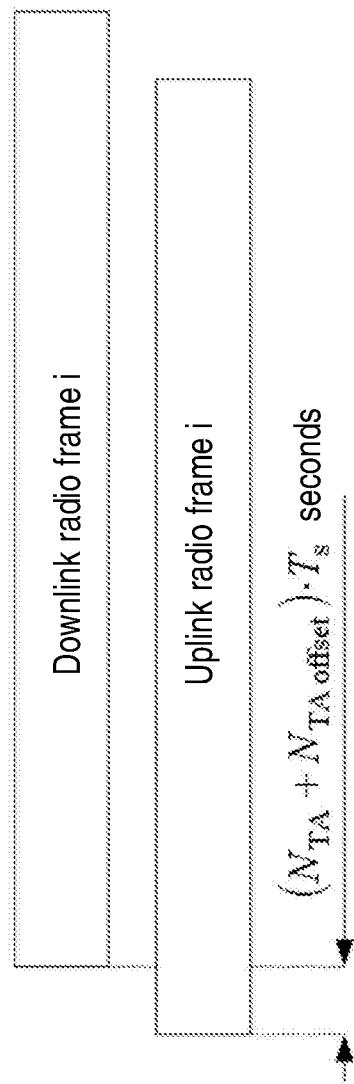
FIG. 1 is a block diagram of an uplink-downlink timing relation.

In one or more embodiments, in LTE and NR, the wireless device (WD) can be served in a cell operating with different bandwidths. The method provides one or more processes for adjusting the WD timing for different bandwidth at different WD speeds. In one or more embodiments, the reception of uplink signals from the WD operating under high speed may be enhanced, as described herein. In one or more embodiments, the WD behavior is defined for WD operating under high speed and in different operating bandwidth as described herein. This helps ensure consistent WD behavior of WDs in a cell. In one or more embodiments, WDs which are not operating at high speed may operate according to legacy requirements which minimizes network implementation and system impacts.

Before describing in detail exemplary embodiments, it is noted that the embodiments reside primarily in combinations of apparatus components and processing steps related to transmit timing adjustments based at least in part on at least one operating characteristic of a wireless device within a cell. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, central unit (e.g., in a network node), distributed unit (e.g., in a network node), multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, vehicle to vehicle, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU), Remote Radio Head (RRH), distributed unit (e.g., in a network node), baseband unit, Centralized Baseband, C-RAN and/or access point (AP).

The term radio access technology, or RAT, may refer to any RAT e.g. UTRA, E-UTRA, narrow band internet of things (NB-IoT), WiFi, Bluetooth, next generation RAT, New Radio (NR), 4G, 5G, etc. Any of the equipment denoted by the terms node, network node or radio network node may be capable of supporting a single or multiple RATs.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

The term signal used herein can be any physical signal or physical channel. Examples of downlink physical signals are reference signal such as Primary Synchronization Signal (PSS), Secondary Synchronization Signal (SSS), Cell Specific Reference Signal (CRS), Positioning Reference Signal (PRS), Channel State Information Reference Signal (CSI-RS), Demodulation Reference Signal (DMRS), Narrowband Reference Signal (NRS), Narrowband Primary Synchronization Signal (NPSS), Narrowband Secondary Synchronization Signal (NSSS), Synchronization Signals (SS), Multimedia Broadcast Single Frequency Reference Signal (MBSFN RS) etc. Examples of uplink physical signals are reference signal such as Sounding Reference Signal (SRS), DMRS, etc. The term physical channel (e.g., in the context of channel reception). The physical channel carries higher layer information (e.g. RRC, logical control channel, etc.). Examples of downlink physical channels are Physical Broadcast Channel (PBCH), Narrowband Physical Broadcast Channel (NPBCH), Physical Downlink Control Channel (PDCCH), Physical Downlink Shared Channel (PDSCH), short Physical Downlink Shared Channel (sPDSCH), Machine Type Communication (MTC) physical downlink control channel (MPDCCH), Narrowband Physical Downlink Control Channel (NPDCCH), Narrow Physical Downlink Shared Channel NPDSCH, Enhanced Physical Downlink Control Channel (E-PDCCH), etc. Examples of uplink physical channels are shorten Physical Uplink Control Channel (sPUCCH). shorten Physical Uplink Shared Channel (sPUSCH), Physical Uplink Shared Channel (PUSCH), Physical Uplink Control Channel (PUCCH), Narrowband Physical Uplink Shared Channel (NPUSCH), Physical Random Access Channel (PRACH), Narrowband Physical Random Access Channel (NPRACH), etc.

The term resource used herein may correspond to any type of physical resource or radio resource expressed in terms of length of time and/or frequency. Signals are transmitted or received by a radio node over a time resource. Examples of time resources are: symbol, time slot, subframe, radio frame, Transmission Time Interval (TTI), interleaving time, etc.

The term time resource used herein may correspond to any type of physical resource or radio resource expressed in terms of length of time. Examples of time resources are: symbol, time slot, subframe, radio frame, TTI, interleaving time, slot, sub-slot, mini-slot, etc.

The term bandwidth (BW) used herein is range of frequencies over which a node transmits to and/or receives signal from another node. The BW is interchangeably called as operating bandwidth, channel bandwidth, system bandwidth, configured bandwidth, transmission bandwidth, cell bandwidth, cell transmission BW, carrier bandwidth, Bandwidth part (BWP), active BWP, configured UE bandwidth etc. The BWP refers to part of the bandwidth over which the UE is configured to receive and/or transmit signals. The BWP can be equal to smaller than the cell BW. The BW can be expressed in any one of the following: X1 Hz (e.g. 20 MHz), in terms of number of physical channels (e.g. X1 resource blocks, X3 subcarriers etc.). In one example the BW can include guard band while in another example the BW can exclude guard band. For example, system or channel BW can include guard band while transmission bandwidth consists of BW without guard band. For simplicity term BW is used in the embodiments.

The term speed used herein may also be called as velocity, Doppler speed etc. The speed may remain the same over time or it may change over time (e.g. increase or decrease). The speed can be expressed in terms of distance per unit time (e.g. in m/s or km/hour), in terms of rate of change of signal level, in terms of channel Doppler spread e.g. Doppler frequency such as in Hz etc. A high speed scenario may also be called as high velocity scenario, high speed train scenario etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A cell may generally be a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC connected or RRC idle state, e.g., in case the node and/or user equipment and/or network follow the LTE-standard. One or more carriers (e.g., uplink and/or downlink carrier/s and/or a carrier for both uplink and downlink) may be associated to a cell.

Transmitting in the downlink may pertain to transmission from the network or network node to the terminal. Transmitting in the uplink may pertain to transmission from the terminal to the network or network node. Transmitting in the sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
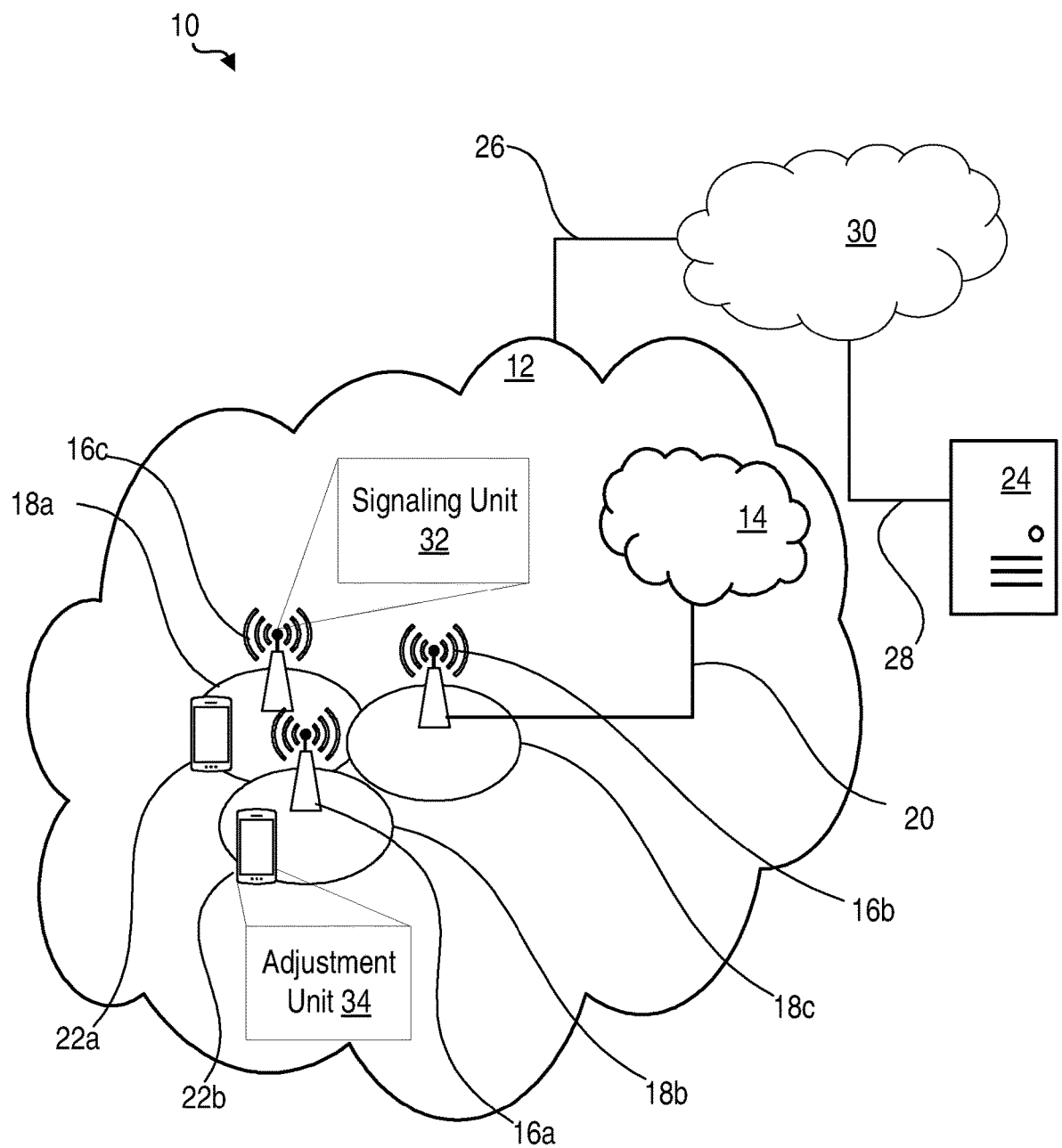
FIG. 2 is a schematic diagram of an exemplary network architecture illustrating a communication system connected via an intermediate network to a host computer according to the principles in the present disclosure.

Embodiments provide transmit timing adjustments based at least in part on at least one operating characteristic of a wireless device within a cell. Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a signaling unit 32. A wireless device 22 is configured to include an adjustment unit 34.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide, determine, transmit, forward, receive, process, relay, communicate, etc. information related to transmit timing adjustments based at least in part on at least one operating characteristic of a wireless device 22 within a cell such as a cell provided by network node 16.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include signaling unit 32 configured to perform one or more network node 16 functions described herein such as with respect to transmit timing adjustments based at least in part on at least one operating characteristic of a wireless device 22 within a cell.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an adjustment unit 34 configured to perform one or more wireless device 22 functions as described herein such as those functions with respect to transmit timing adjustments based at least in part on at least one operating characteristic of a wireless device 22 within a cell.

Figure 3:
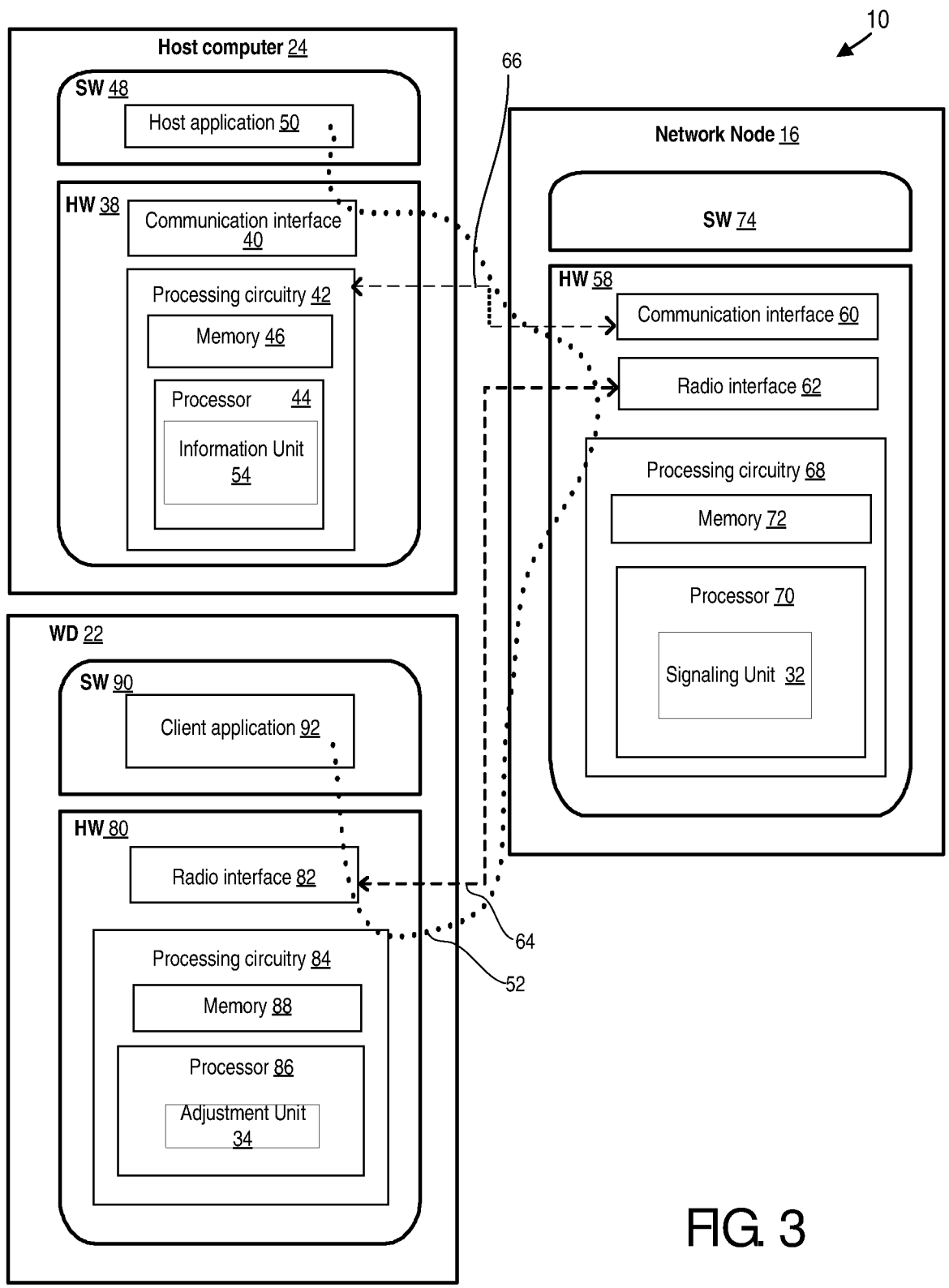
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as signaling unit 32, and adjustment unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
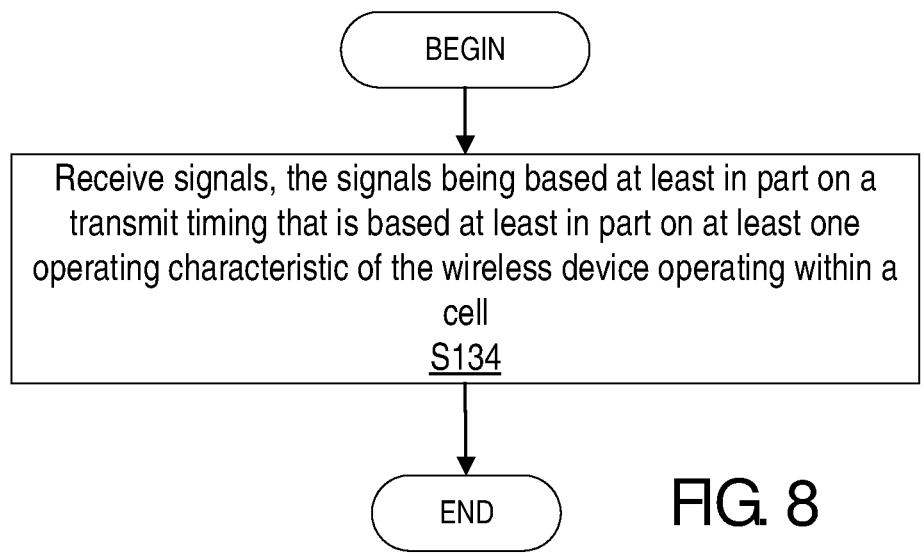
FIG. 8 is a flowchart of an exemplary process in a network node according to some embodiments of the present disclosure.

FIG. 8 is a flowchart of an exemplary process in a network node 16 according to one or more embodiments of the present disclose. One or more Blocks and/or functions performed by network node 16 may be performed by one or more elements of network node 16 such as by signaling unit 32 in processing circuitry 68, processor 70, radio interface 62, etc. In one or more embodiments, network node 16 such as via one or more of processing circuitry 68, processor 70, communication interface 60 and radio interface 62 is configured to receive (Block S134) signals where the signals are based at least in part on a transmit timing that is based at least in part on at least one operating characteristic of the wireless device operating within a cell.

According to one or more embodiments, the at least one operating characteristic includes at least one of a speed of the wireless device and a bandwidth with which the wireless device is operating within the cell. According to one or more embodiments, the transmit timing is based at least in part on at least one transmission timing parameter.

Figure 9:
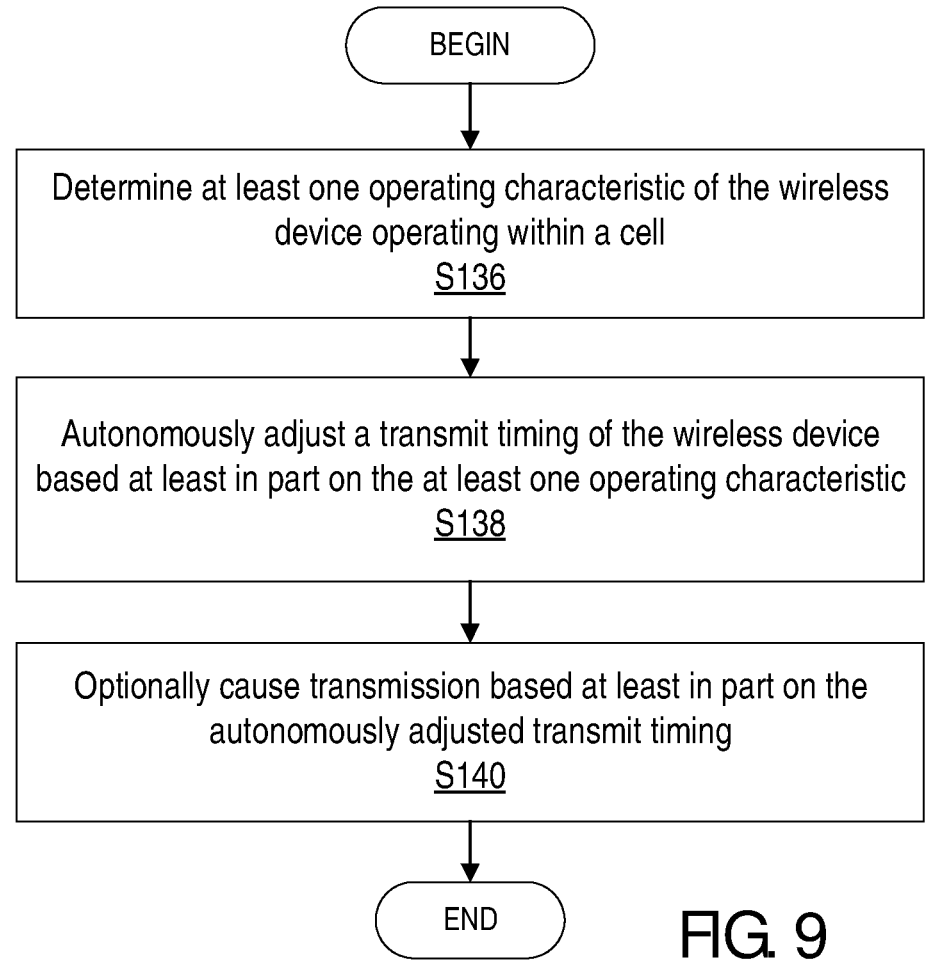
FIG. 9 is a flowchart of an exemplary process in a wireless device according to some embodiments of the present disclosure.

FIG. 9 is a flowchart of an exemplary process in a wireless device 22 according to some embodiments of the present disclosure. One or more Blocks and/or functions performed by wireless device 22 may be performed by one or more elements of wireless device 22 such as by adjustment unit 34 in processing circuitry 84, processor 86, radio interface 82, etc. In one or more embodiments, wireless device such as via one or more of processing circuitry 84, processor 86 and radio interface 82 is configured to determine (Block S136) at least one operating characteristic of the wireless device operating within a cell. In one or more embodiments, wireless device such as via one or more of processing circuitry 84, processor 86 and radio interface 82 is configured to autonomously adjust (Block S138) a transmit timing of the wireless device based at least in part on the at least one operating characteristic. In one or more embodiments, wireless device such as via one or more of processing circuitry 84, processor 86 and radio interface 82 is configured to optionally cause (Block S140) transmission based at least in part on the autonomously adjusted transmit timing.

In one or more embodiments, the at least one operating characteristic includes at least one of a speed of the wireless device 22 and a bandwidth with which the wireless device 22 is operating within the cell. In one or more embodiments, the autonomously adjusted transmit timing is based at least in part on at least one transmission timing parameter.

Figure 10:
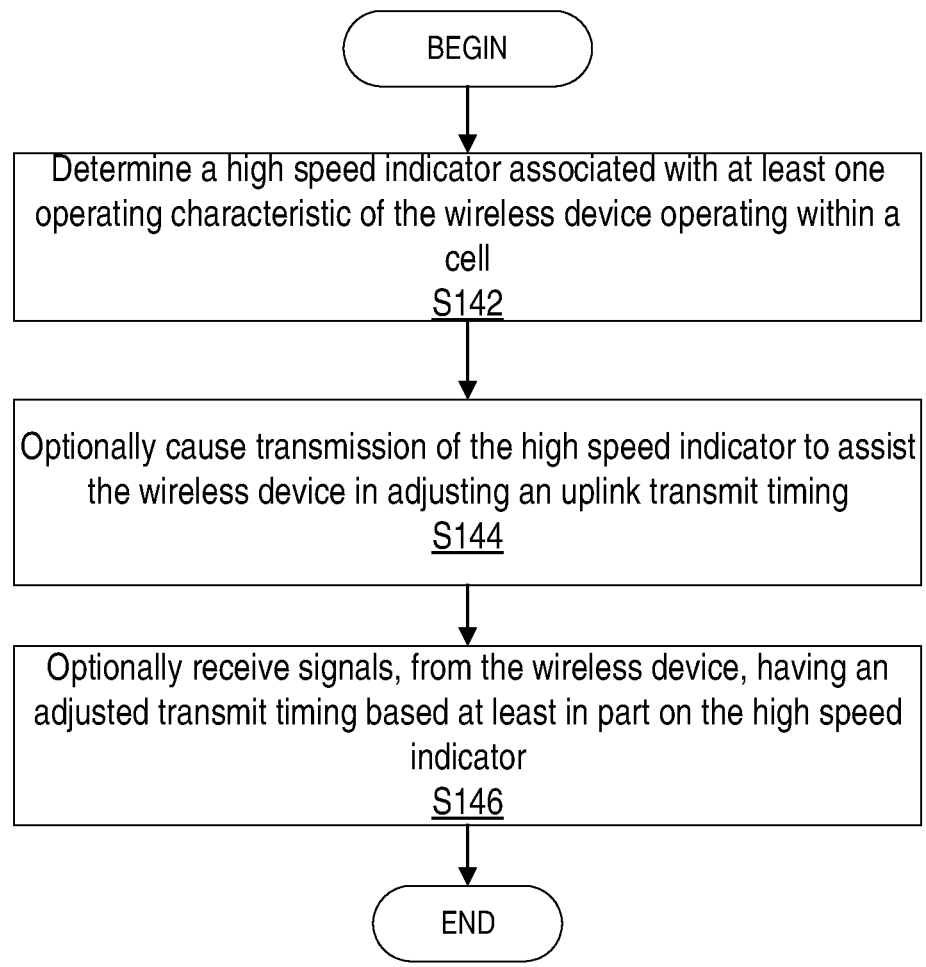
FIG. 10 is a flowchart of another exemplary process in a network node according to some embodiments of the present disclosure.

FIG. 10 is a flowchart of another exemplary process in a network node 16 according to one or more embodiments of the present disclose. One or more Blocks and/or functions performed by network node 16 may be performed by one or more elements of network node 16 such as by signaling unit 32 in processing circuitry 68, processor 70, radio interface 62, etc. In one or more embodiments, network node 16 such as via one or more of processing circuitry 68, processor 70, communication interface 60 and radio interface 62 is configured to determine (Block S142) a high speed indicator associated with at least one operating characteristic of the wireless device 22 operating within a cell.

In one or more embodiments, network node 16 such as via one or more of processing circuitry 68, processor 70, communication interface 60 and radio interface 62 is configured to optionally cause (Block S144) transmission of the high speed indicator to assist the wireless device in adjusting an uplink transmit timing.

In one or more embodiments, network node 16 such as via one or more of processing circuitry 68, processor 70, communication interface 60 and radio interface 62 is configured to optionally receive (Block S146) signals, from the wireless device, having an adjusted transmit timing based at least in part on the high speed indicator.

In one or more embodiments, the at least one operating characteristic includes at least one of a speed of the wireless device 22 and a bandwidth with which the wireless device 22 is operating within the cell. In one or more embodiments, the adjusted transmit timing is based at least in part on at least one transmission timing parameter.

Figure 11:
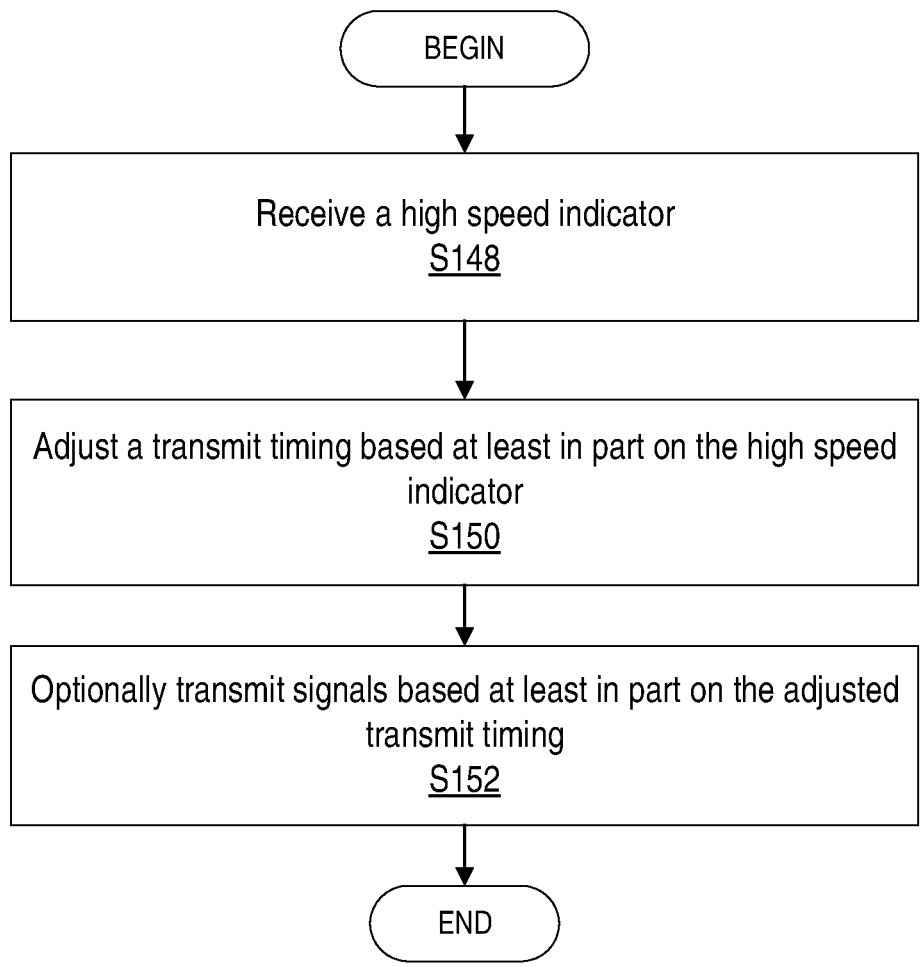
FIG. 11 is a flowchart of another exemplary process in a wireless device according to some embodiments of the present disclosure.

FIG. 11 is a flowchart of another exemplary process in a wireless device 22 according to some embodiments of the present disclosure. One or more Blocks and/or functions performed by wireless device 22 may be performed by one or more elements of wireless device 22 such as by adjustment unit 34 in processing circuitry 84, processor 86, radio interface 82, etc. In one or more embodiments, wireless device such as via one or more of processing circuitry 84, processor 86 and radio interface 82 is configured to receive (Block S148) a high speed indicator. In one or more embodiments, wireless device such as via one or more of processing circuitry 84, processor 86 and radio interface 82 is configured to adjust (Block S150) a transmit timing based at least in part on the high speed indicator. In one or more embodiments, wireless device such as via one or more of processing circuitry 84, processor 86 and radio interface 82 is configured to optionally transmit (Block S152) signals based at least in part on the adjusted transmit timing.

In one or more embodiments, the high speed indicator is associated with at least one operating characteristic of the wireless device 22 operating within a cell. In one or more embodiments, the adjusted transmit timing is based at least in part on at least one transmission timing parameter.

Figure 12:
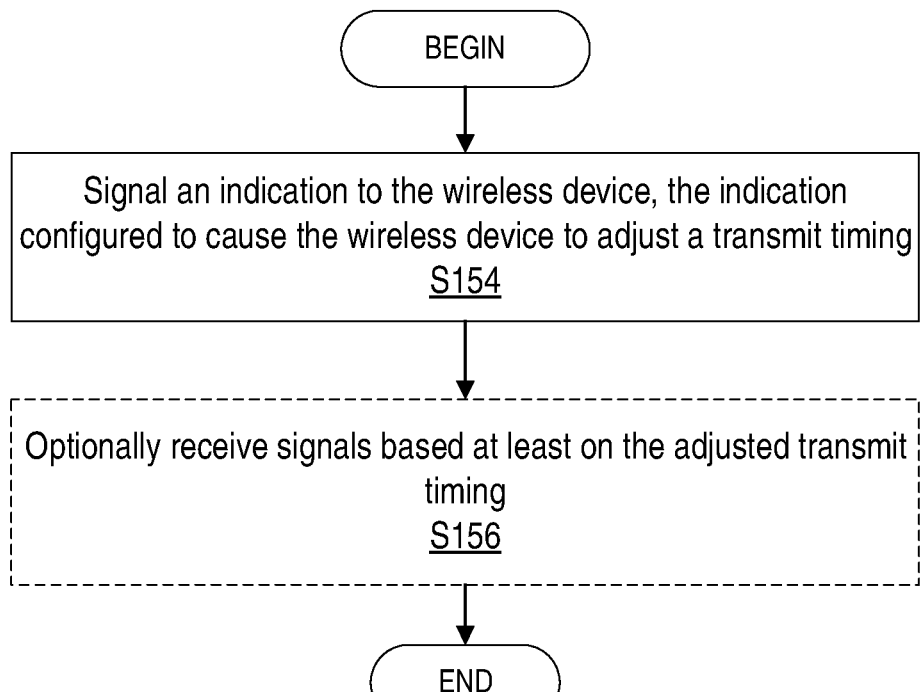
FIG. 12 is a flowchart of yet another exemplary process in a network node according to some embodiments of the present disclosure.

FIG. 12 is a flowchart of yet another exemplary process in a network node 16 according to one or more embodiments of the present disclose. One or more Blocks and/or functions performed by network node 16 may be performed by one or more elements of network node 16 such as by signaling unit 32 in processing circuitry 68, processor 70, radio interface 62, etc. In one or more embodiments, network node 16 such as via one or more of processing circuitry 68, processor 70, communication interface 60 and radio interface 62 is configured to signal (Block S154) an indication to the wireless device 22 where the indication is configured to cause the wireless device 22 to adjust a transmit timing, as described herein.

In one or more embodiments, network node 16 such as via one or more of processing circuitry 68, processor 70, communication interface 60 and radio interface 62 is configured to optionally receive (Block S156) signals based at least on the adjusted transmit timing, as described herein.

According to one or more embodiments, the indication is provided by an indicator that includes at least one indicator parameter, the at least one indicator parameter indicating one of a plurality of operational schemes for the wireless device 22 to implement. According to one or more embodiments, the adjusting of the transmit timing includes switching from a first operational scheme to a second operational scheme, each operational scheme defining a plurality of respective values for a plurality of transmit timing parameters. According to one or more embodiments, the first operational scheme is configured to be used by the wireless device 22 in the absence of transmission of the indication.

According to one or more embodiments, the plurality of transmit timing parameters includes at least one of a maximum magnitude of a timing adjustment step, a minimum aggregate transmit timing adjustment rate and a maximum aggregated timing adjustment. According to one or more embodiments, the indication is broadcast within a cell. According to one or more embodiments, the processing circuitry 68 is further configured to: determine one of a plurality of speed ranges associated with the wireless device 22 where each speed range is associated with a respective operational scheme for the wireless device, and where the indication is based at least on the determined one of the plurality of speed ranges.

According to one or more embodiments, the indication is not provided by a timing advance command. According to one or more embodiments, the processing circuitry 68 is further configured to: estimate a speed of the wireless device 22 based at least on at least one of: a geographical area where the wireless device 22 is located and historical speed data of the wireless device 22. The indication is based at least on the estimated speed of the wireless device 22.

According to one or more embodiments, the processing circuitry 68 is further configured to determine at least one of a bandwidth associated with a cell serving the wireless device 22, a subcarrier spacing associated with a cell serving the wireless device 22 and a numerology associated with a cell serving the wireless device 22, where the indication is based at least in part on the determined at least one of bandwidth, subcarrier spacing and numerology. According to one or more embodiments, the determined bandwidth is one of a bandwidth of the cell, a bandwidth part associated with the wireless device 22 and a bandwidth of a reference signal.

Figure 13:
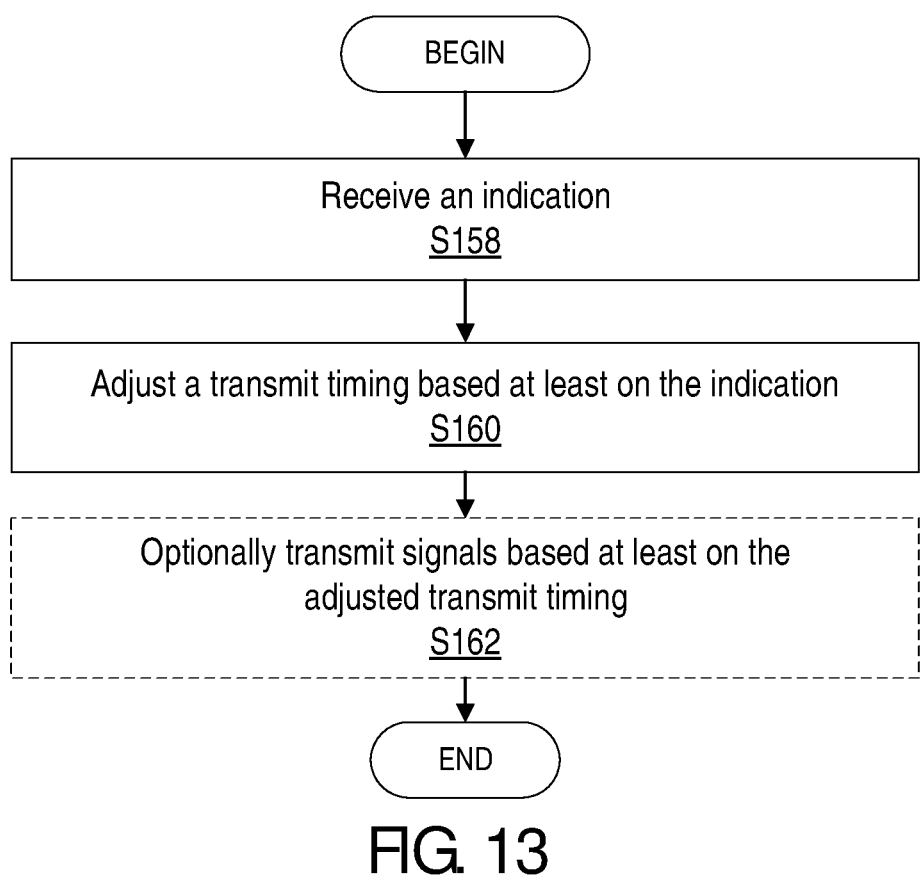
FIG. 13 is a flowchart of yet another exemplary process in a wireless device according to some embodiments of the present disclosure.

FIG. 13 is a flowchart of yet another exemplary process in a wireless device 22 according to some embodiments of the present disclosure. One or more Blocks and/or functions performed by wireless device 22 may be performed by one or more elements of wireless device 22 such as by adjustment unit 34 in processing circuitry 84, processor 86, radio interface 82, etc. In one or more embodiments, wireless device such as via one or more of processing circuitry 84, processor 86 and radio interface 82 is configured to receive (Block S158) an indication, as describe herein. In one or more embodiments, wireless device such as via one or more of processing circuitry 84, processor 86 and radio interface 82 is configured to adjust (Block S160) a transmit timing based at least on the indication, as described herein. In one or more embodiments, wireless device such as via one or more of processing circuitry 84, processor 86 and radio interface 82 is configured to optionally transmit (Block S162) signals based at least on the adjusted transmit timing, as described herein.

According to one or more embodiments, the indication is provided by an indicator that includes at least one indicator parameter where the at least one indicator parameter indicates one of a plurality of operational schemes for the wireless device 22 to implement. According to one or more embodiments, the adjusting of the transmit time includes switching from a first operational scheme to a second operational scheme, each operational scheme defining a plurality of respective values for a plurality of transmit timing parameters. According to one or more embodiments, the first operational scheme is configured to be used by the wireless device 22 in the absence of reception of the indication.

According to one or more embodiments, the plurality of transmit timing parameters includes at least one of a maximum magnitude of a timing adjustment step, a minimum aggregate transmit timing adjustment rate and a maximum aggregated timing adjustment. According to one or more embodiments, the indication is broadcast within a cell. According to one or more embodiments, the indication indicates that the wireless device 22 is associated with one of a plurality of speed ranges, each speed range being associated with a respective operational scheme.

According to one or more embodiments, the indication is not provided by a timing advance command. According to one or more embodiments, the indication is based at least on an estimated speed of the wireless device 22 where the estimated speed of the wireless device 22 is based at least on at least one of: a geographical area where the wireless device 22 is located, and historical speed data of the wireless device 22. According to one or more embodiments, the indication is based on at least one of a bandwidth associated with a cell serving the wireless device 22, a subcarrier spacing associated with a cell serving the wireless device 22 and a numerology associated with a cell serving the wireless device 22. According to one or more embodiments, the bandwidth is one of a bandwidth of the cell, a bandwidth part associated with the wireless device 22 and a bandwidth of a reference signal.

Having generally described arrangements for transmit timing adjustments based at least in part on at least one operating characteristic of a wireless device 22 within a cell, details for these arrangements, functions and processes are provided as follows, and which may be implemented by the network node 16, wireless device 22 and/or host computer 24.

Embodiments provide transmit timing adjustments based at least in part on at least one operating characteristic of a wireless device within a cell.

Example #1: Method in WD 22 on Timing Adjustment Based on Speed and Bandwidth According to one or more embodiments, the WD 22 served by the first cell (cell1) and via processing circuitry 84 and/or adjustment unit 34:
- Obtains information about its speed (V) with which it is operating in cell1,
- Obtains information about the bandwidth (BW) with which it is operating in cell1,
- Determines at least one parameter associated with WD transmit timing adjustment based on the obtained information about V and BW,
- Uses the transmit timing adjustment parameter(s) for autonomously adjusting its transmit timing for transmitting uplink signals in cell1.

Obtaining WD Speed, i.e., Determining at Least One Operating Characteristic of Wireless Device Operation within a Cell In this step the WD 22 obtains, via radio interface 82 and/or processing circuitry 84 information about the WD speed autonomously and/or based on information received from the network node, e.g., from cell1. For example, cell 1 can be the serving cell of the WD 22. In one or more embodiments, the principles or criteria used for determining the WD speed are described below:
- Autonomous determination: processing circuitry 84 and/or adjustment unit 34 autonomously determines WD speed based at least in part by estimating the WD speed based on signals received, via radio interface 82, by the WD 22, e.g., from cell 1 (i.e., network node 16). For example, the speed can be determined by estimating the Doppler frequency of downlink (DL) reference signals received at the WD 22. In yet another example the speed is determined based on the rate of change in the received signal level, e.g., signal strength. In another example, the speed is estimated from the rate of change of channel estimates used in the WD receiver. In yet another example the WD 22 can use an external equipment such as acceleration sensor or GNSS receiver for determining the WD speed (e.g., based on GPS signals), i.e., WD 22 is in communication with the external equipment and is able to receive data/information the external equipment.
- Receiving information about speed: processing circuitry 84 and/or adjustment unit 34 is configured to determine WD speed based at least in part by receiving information about the WD speed from a network node (e.g., NW1 managing serving cell such as cell1) or another WD 22 which has the information about the WD speed. In yet another example, if the WD 22 has received or is configured with a speed related information associated with cell 1 from NW1 then the WD 22 assumes that the WD 22 is operating under high speed, otherwise the WD 22 is assumed to be operating under lower speed. Examples of high speed are Doppler frequency above certain threshold, e.g., 875 Hz, 1250 Hz, 350 km/hour etc. For example, if the WD 22 receives, via radio interface 82, or is configured with an indicator (e.g., high speed indicator (HSI)) in cell 1 from NW1 then the WD 22 may assume/determine that the WD speed (V) is equal to or above certain speed threshold (Vt) (e.g., operating in high speed scenario such as when V≥Vt); otherwise if no such indicator is received by the WD 22 then the WD 22 may assume that the WD speed is below the speed threshold (Vt) (e.g., operating in low speed scenario such as when V<Vt). In yet another example, the HSI may indicate the range of speeds, e.g., HSI may indicate that the WD speed is between 350 km/hour and 500 km/hour, Doppler speed is between 875 Hz and 1250 Hz assuming 2.7 GHz etc. The WD 22 may also be configured with 2 or more HSI indicating different speed levels or different speed ranges, e.g., HSI1 and HSI2.
- Pre-defined information: For example, if cell 1 serves the WD 22 in a geographical area or zone where high speed vehicles traverse then the WD 22 may assume and/or determine, via processing circuitry 84 and/or adjustment unit 34, based at least in part on the criteria that its speed is above certain threshold. For example, such coverage area or zone may contain rail track for train or motorway. In this case, the WD 22 may determine, via processing circuitry 84 and/or adjustment unit 34, the WD 22 speed based on the speed with which the vehicle is expected to travel in that zone, e.g., 350 km/hour for high speed train, 120 km/hour for vehicles driving on the motorway, etc.
- Historical data or statistics: The WD 22 speed may be determined, via processing circuitry 84 and/or adjustment unit 34, based at least in part on statistics of the WD speed obtained in one or more previous time resources, e.g., average WD 22 speed in cell 1 over certain time period, number of handovers between cells over a certain time period.

Obtaining Information about the Bandwidth, i.e., Determining at Least One Operating Characteristic of Wireless Device Operation within a Cell In this step, the WD 22, via radio interface 82, obtains information about the bandwidth (BW) with which the WD 22 is configured to operate in cell1. In one example, the BW corresponds to the BW of cell1. In another example, the BW corresponds to the BW with which the WD 22 is configured to operate in cell1, e.g., BWP. The BW or BWP can be the downlink BW and/or uplink BW. The BW may also correspond to the BW of a signal, e.g., reference signal such as SSB, CSI-RS, DMRS, etc. The BW can therefore, in one or more embodiments, be determined implicitly by one or more other parameters, e.g., numerology of signals such as reference signal (RS). For example, the BW can be determined based on the SCS of the RS such as SSB and/or SCS of CSI-RS used in cell 1 in NR. The SSB includes the same number of resource blocks (e.g., 20 RBs) regardless of the SCS of the SSB. For example, the BW of SSB is 3.6 MHz, 7.2 MHz, 28.8 MHz and 57.6 MHz for SSB SCS of 15 kHz, 30 kHz, 120 kHz and 240 kHz respectively.

The WD 22 can, via processing circuitry 84 and/or adjustment unit 34, determine the BW (explicit value or implicitly, e.g., based on SCS of RS) based on received information from the network node 16 (e.g. by configuration message from the network node 16 in RRC, MAC, L1 signaling etc.), autonomously, pre-defined information (e.g. SCS of SSB used in cell1) etc.

Determining Transmit Timing Parameter(s) Information Associated with the Speed and Bandwidth In this step, the WD 22, via processing circuitry 84 and/or adjustment unit 34, determines at least one parameter (i.e., at least one transmit timing parameter) related to the WD 22 transmit timing adjustment associated with the determined information related to the WD speed (V) and the bandwidths (in previous step). The association can be based on one or more rules. The rules can be pre-defined, configured by the network node 16 (e.g. serving BS), autonomously by the WD 22. Examples of parameters (i.e., transmit timing parameters) related to the WD 22 transmit timing adjustment are:

Tij=The maximum amount of the magnitude of the WD transmit timing change in one adjustment.

Rij=The minimum aggregate WD transmit timing adjustment rate.

Dij=The duration over which the maximum aggregate WD transmit timing adjustment rate is applied.

The association between the WD transmit timing adjustment parameters and the parameters V and BW are described with several examples below in tables 1-8 where, as used herein, a table, a row in the table and/or one or more columns in a row in the table may correspond to an operational scheme implemented by WD 22.

Tables 1 and 2 provide general examples of association between parameters (Tij and V and BW), and parameters (Dij and V and BW) respectively where Tij and Dij are examples of transmit timing parameters. Tables 3 and 4 provide specific examples of association between parameters (Tij and V and BW), and parameters (Dij and V and BW) respectively. In these examples (Tables 1-4), it may be assumed that the WD 22 can be configured with only one possible high speed indicator (HSI) by the network node 16. The HSI can for example indicate that the WD 22 speed is up to a certain and/or predefined value (e.g., 350 km/hour, 500 km/hour, 1250 kHz of Doppler frequency, etc.) or range of speeds (e.g., between 300 km/hour and 500 km/hour, between 875 kHz and 1250 kHz of Doppler frequencies etc.) where the speed and/or range of speeds may be considered an indicator parameter included in the HSI (i.e., indicator). As shown in these examples, when the WD 22 is under high speed, the values of magnitude of Tij and/or Dij are shortened for only bandwidths larger than certain threshold (BWt). For example, as shown in Table 3, that under high speed BW may be 5 MHz and larger than the Tij=7 Ts while under low speed the Tij for BW=5 MHz may be 5.5 Ts and for BW≥10 MHz Tij may be 3.5 Ts. Similarly, as shown in the example as shown in Table 3 that high speed may correspond to when BW is 5 MHz and is larger than the Tij=7 Ts while low speed may correspond to the Tij for BW=5 MHz is 5.5 Ts and for BW≥10 MHz is 3.5 Ts. This may occur because at higher speed the WD 22 experiences larger drift or variation or change in the timing of the received signals (e.g., from the serving cell) used by the WD 22 for its transmit timing adjustment. The drift or variation or change in the timing of the signals is caused by multiple factors, e.g., frequency error of signals, errors due to the Doppler frequency (which increases with speed), WD speed, etc. Therefore, as described herein, in order to help compensate the larger variation in the timing of the signals received at the WD 22, one or more WD 22 transmit timing adjustment parameters are adapted. In one or more embodiments, the transmit timing adjustment parameters are not part of a TA command, and the signaling for the WD 22 to adjust these parameters is not in the form of a TA command. In particular, the transmit timing adjustment parameters may be applied by the WD 22 in the absence of a valid TA command such as a TA adjustment command or after expiration of a TA command. In these examples 1 Ts=32.55 ns (which is a time unit in LTE).

TABLE 1

A general example of association between Tij, V and BW based on one HSI

| Scenario | WD configured with high speed indicator (HSI) | Bandwidth (BW) | Max magnitude of timing adjustment step (Tij) |
|---|---|---|---|
| 1 | NO | BW < BWt | T01 |
| 2 |  | BW ≥ BWt | T02 |
| 3 | YES | BW < BWt | T01 |
| 4 |  | BW ≥ BWt | T11 |

TABLE 2

A general example of association between Dij, V and BW based on one HSI

| Scenario | WD configured with high speed indicator (HSI) | Bandwidth (BW) | Duration over which to apply max aggregated timing adjustment (Dij) |
|---|---|---|---|
| 1 | NO | BW < BWt | D01 |
| 2 |  | BW ≥ BWt | D02 |
| 3 | YES | BW < BWt | D01 |
| 4 |  | BW ≥ BWt | D11 |

TABLE 3

A specific example of association between Tij, V and BW based on one HSI

| Scenario | WD configured with high speed indicator (HSI) | Bandwidth (BW) | Max magnitude of timing adjustment step (Tij) |
|---|---|---|---|
| 1 | NO | BW = 1.4 MHz | 17.5*Ts |
| 2 |  | BW = 3 MHz | 9.5*Ts |
| 3 |  | BW = 5 MHz | 5.5*Ts |
| 4 |  | BW > 10 MHz | 3.5*Ts |
| 5 | YES | BW = 1.4 MHz | 17.5*Ts |
| 6 |  | BW = 3 MHz | 9.5*Ts |
| 7 |  | BW > 5 MHz | 7*Ts |

TABLE 4

A specific example of association between Dij, V and BW based on one HSI

| Scenario | WD configured with high speed indicator (HSI) | Bandwidth (BW) | Duration over which to apply max aggregated timing adjustment (Dij) |
|---|---|---|---|
| 1 | NO | BW > 1.4 MHz | 200 ms |
| 2 | YES | BW < 5 MHz | 200 ms |
| 3 |  | BW > 5 MHz | 100 ms |

Tables 5 and 6 provide general examples of association between parameters (Tij and V and BW), and parameters (Dij and V and BW) respectively assuming that the WD 22 can be configured with one out of two possible high speed indicators, e.g., HSI1 and HSI2. Tables 7 and 8 provide specific examples of association between parameters (Tij and V and BW), and parameters (Dij and V and BW) respectively assuming that the WD 22 can be configured with one out of two possible high speed indicators, e.g., HSI1 and HSI2. It may be further assumed that HSI1 is associated with smaller speed (or range of speeds) compared to the speed (or range of speeds) associated with HSI2. For example HSI1 and HSI2 can be associated with speed up to 350 km/hour and up to 500 km/hour respectively. The examples in Tables 1-8 can be generalized to any number (n) of high speed indicators e.g. HSI1, HSI2, . . . , HSIn, etc.

TABLE 5

A general example of association between Tij, V and BW with two different HSIs

| Scenario | WD configured with high speed indicator (HSI) | Bandwidth (BW) | Max magnitude of timing adjustment step (Tij) |
|---|---|---|---|
| 1 | NO | BW < BWt | T01 |
| 2 |  | BW ≥ BWt | T02 |
| 3 | YES: HSI1 | BW < BWt | T01 |
| 4 |  | BW ≥ BWt | T11 |
| 5 | YES: HSI2 | BW < BWt | T01 |
| 6 |  | BW ≥ BWt | T21 |

TABLE 6

A general example of association between Dij, V and BW with two different HSIs

| Scenario | WD configured with high speed indicator (HSI) | Bandwidth (BW) | Duration over which to apply max aggregated timing adjustment (Dij) |
|---|---|---|---|
| 1 | NO | BW < BWt | D01 |
| 2 |  | BW ≥ BWt | D02 |
| 3 | YES: HSI1 | BW < BWt | D01 |
| 4 |  | BW ≥ BWt | D11 |
| 5 | YES: HSI2 | BW < BWt | D01 |
| 6 |  | BW ≥ BWt | D21 |

TABLE 7

A specific example of association between Tij, V and BW based on two HSIs

| Scenario | WD configured with high speed indicator (HSI) | Bandwidth (BW) | Max magnitude of timing adjustment step (Tij) |
|---|---|---|---|
| 1 | NO | BW = 1.4 MHz | 17.5*Ts |
| 2 |  | BW = 3 MHz | 9.5*Ts |
| 3 |  | BW = 5 MHz | 5.5*Ts |
| 4 |  | BW ≥ 10 MHz | 3.5*Ts |
| 5 | YES: HSI1 | BW = 1.4 MHz | 17.5*Ts |
| 6 |  | BW = 3 MHz | 9.5*Ts |
| 7 |  | BW = 5 MHz | 5.5*Ts |
| 8 |  | BW ≥ 10 MHz | 5*Ts |
| 9 | YES: HSI2 | BW = 1.4 MHz | 17.5*Ts |
| 10 |  | BW = 3 MHz | 9.5*Ts |
| 11 |  | BW ≥ 5 MHz | 7*Ts |

HSI1 corresponds to: V ≤ 350 km/hour and/or Doppler speed ≤ 875 Hz
HSI2 corresponds to: (350 < V ≤ 500 km/hour) and/or (875 Hz < Doppler speed ≤ 1250 Hz)

TABLE 8

A specific example of association between Dij, V and BW based on two HSIs

| Scenario | WD configured with high speed indicator (HSI) | Bandwidth (BW) | Duration over which to apply max aggregated timing adjustment (Dij) |
|---|---|---|---|
| 1 | NO | BW ≥ 1.4 MHz | 200 ms |
| 2 | YES: HSI1 | BW < 10 MHz | 200 ms |
| 3 |  | BW ≥ 10 MHz | 150 ms |
| 10 | YES: HSI2 | BW < 5 MHz | 200 ms |
| 11 |  | BW ≥ 5 MHz | 100 ms |

HSI1 corresponds to: V < 350 km/hour and/or Doppler speed < 875 Hz
HSI2 corresponds to: (350 < V < 500 km/hour) and/or (875 Hz < Doppler speed < 1250 Hz)

Tables 9 and 10 provide additional examples where the BW is implicitly related to the SCS of a signal (e.g., reference signal) and based on the received HSI, the WD 22 may adapt the maximum autonomously adjustment step size (e.g., from 5.5 Ts to 7 Ts) only when SCS is larger than certain threshold (SCSt). A similar example based on SCS can be applicable for the adaptation of Tij based on the WD speed for any number of HSI. Other parameters such as the duration over which to apply max aggregated timing adjustment (Dij) can also be adapted based at least in part on the SCS. This is shown in examples in Tables 11 and 12.

For example, at WD speed of 500 km/hour, the Doppler speed of 1250 Hz (e.g., at 2.7 GHz) and with frequency error of ±0.1 ppm, the total time drift can be around 6.3 Ts. Therefore, the max step autonomous size may be increased from 3.5 Ts to 7 Ts for only bandwidths ≥5 MHz. In another example, at WD speed of 350 km/hour, the Doppler speed of 875 Hz (e.g., at 2.7 GHz) and with frequency error of ±0.1 ppm, the total time drift can be around 4.6 Ts. Therefore, the max step autonomous size may be increased from 3.5 Ts to 5 Ts for only bandwidths ≥10 MHz.

TABLE 9

A general example of association between Tij, V and SCS based on one HSI

| Scenario | WD configured with high speed indicator (HSI) | Subcarrier spacing (SCS) | Max magnitude of timing adjustment step (Tij) |
|---|---|---|---|
| 1 | NO | SCS < SCSt | T01 |
| 2 |  | SCS ≥ SCSt | T02 |
| 3 | YES | SCS < SCSt | T01 |
| 4 |  | SCS ≥ SCSt | T11 |

TABLE 10

A specific example of association between Tij, V and SCS based on one HSI

| Scenario | WD configured with high speed indicator (HSI) | Subcarrier spacing of RS (SCS) | Max magnitude of timing adjustment step (Tij) |
|---|---|---|---|
| 1 | NO | SCS < 15 kHz | 9.5 Ts |
| 2 |  | SCS ≥ 15 kHz | 5.5 Ts |
| 3 | YES | SCS < 15 kHz | 9.5 Ts |
| 4 |  | SCS ≥ 15 kHz | 7 Ts |

TABLE 11

A general example of association between Dij, V and SCS based on one HSI

| Scenario | WD configured with high speed indicator (HSI) | Subcarrier spacing (SCS) | Duration over which to apply max aggregated timing adjustment (Dij) |
|---|---|---|---|
| 1 | NO | SCS < SCSt | D01 |
| 2 |  | SCS ≥ SCSt | D02 |
| 3 | YES | SCS < SCSt | D01 |
| 4 |  | SCS ≥ SCSt | D11 |

TABLE 12

A specific example of association between Dij, V and SCS based on one HSI

| Scenario | WD configured with high speed indicator (HSI) | Subcarrier spacing of RS (SCS) | Duration over which to apply max aggregated timing adjustment (Dij) |
|---|---|---|---|
| 1 | NO | SCS < 15 kHz | 200 ms |

TABLE 12-continued

A specific example of association between Dij, V and SCS based on one HSI

| Scenario | WD configured with high speed indicator (HSI) | Subcarrier spacing of RS (SCS) | Duration over which to apply max aggregated timing adjustment (Dij) |
|---|---|---|---|
| 2 |  | SCS ≥ 15 kHz | 200 ms |
| 3 | YES | SCS < 15 kHz | 200 ms |
| 4 |  | SCS ≥ 15 kHz | 150 ms |

Using the Determined Information about Transmit Timing Parameter(s) for Adjusting WD Timing In this step the WD 22, via processing circuitry 84 and/or adjustment unit 34, uses the determined information about the transmit timing parameter(s) (as described in above) for performing one or more operations. Examples of such operations may include using one or more parameters for autonomously adjusting the transmit timing of the WD 22 for transmitting signals in cell1. After adjusting the WD 22's transmit timing the WD 22 may transmit the signals in cell 1 according to the adjusted timing.

Example #2: Method in Network Node 16 for Determining and Transmitting to WD 22, a High Speed Indicator Based on WD Speed and Bandwidth According to one or more embodiments, the network node 16, via processing circuitry 68, signaling unit 32 and/or radio interface 62, is configured to one or more of:

Obtain information about a WD speed (V) served by a first cell (cell1),

Obtain information about the bandwidth (BW) with which the WD 22 is operating in cell1, Determine a high-speed indicator (HSI) (i.e., indicator) associated with the determined V and BW, to the WD 22, the HSI enables the WD 22 to determine parameter(s) for adjusting its uplink transmit timing. That is, the HSI may indicate an operational scheme for the wireless device 22 to implement and/or switch to.

Transmit the HSI to the WD 22,

Receive the signals from the WD 22 based on the usage of the HSI.

The above steps are described in further detail below:

The network node 16, via processing circuitry 68 and/or signaling unit 32, determines the WD 22 speed as described in the Obtaining WD speed section above. For example, the network node 16, via processing circuitry 68 and/or signaling unit 32, may estimate the speed of the wireless device 22 based at least on one of a geographical area where the WD 22 is located and historical speed data of the WD 22 as described in the Obtaining WD speed section above. Using information such as geographical area and historical speed data may corresponds an estimated speed that may or may not represent the actual speed of the WD 22 at the time the determination is performed, but may provide a less complex method for estimating WD speed.

The network node 16, via processing circuitry 68 and/or signaling unit 32, determines the BW in cell 1 for operating or serving the WD 22 in cell1 based at least in part on information available in cell1, e.g., information stored in cell1, information signaled by cell 1 to the WD 22, etc.

The network node 16, via processing circuitry 68 and/or signaling unit 32, further determines a high-speed indicator (HSI) or one out of plurality of HSIs (e.g., HSI1, HSI2, etc.). The HSI is associated with the determined V and BW, i.e., is associated with at least one determined operation characteristic. The HSI allows the WD 22 to determine one or more parameter(s) of an operational scheme for adjusting its uplink transmit timing for transmitting signals in cell 1 as described in examples in Tables 1-8. For example, HSI may indicate for the WD 22 to switch from a first operational scheme to a second operational scheme where each operational scheme may define at least one respective value (e.g., SCS <15 kHz, Dij=200 ms, etc.) for transmit timing parameters (e.g., Dij, Tij, etc.). Further, in the absence of an HSI, the WD 22 may continue using a first operational scheme, i.e., may not switch from its current operational scheme.

The network node 16, via radio interface 62, signals the determined HSI to the WD 22 served by cell1. The WD 22 uses the received HSI for adjusting its UL transmit timing for sending signals in cell 1 as described herein where the WD 22 uses the determined information about transmit timing parameter(s) for adjusting WD timing section. In one or more embodiments, if there are no WDs 22 with a respective speed above certain threshold in cell1 then the network node 16 may not signal any HSI to the WD 22 in cell1. In one or more embodiments, the type of HSI used by the network node 16 is based on the speed or range of speeds of the WD 22 in cell1. For example, the network node 16 uses and/or determines HSI1 or HSI2 depending on the WD speed or speed ranges. Examples of WD speeds or range of speeds associated with HSI1 and HSI2 are described the Determining information transmit timing parameter(s) associated with the speed and bandwidth section. In one or more embodiments, the HSI may be broadcast within a cell provided by network node 16.

The network node 16, via radio interface 62, receives the signals from the WD 22, where the received signals are transmitted by the WD 22 based on the obtained information about the HSI. For example, the WD 22 uses the association or relations between the HSI and BW (e.g., in Tables 1-8) for determining the values of the parameters for adjusting its transmit timing (e.g., Tij, Dij, etc.). The process help ensure that the network node 16 receives the uplink signals from the WDs 22 in cell 1 within the CP length of the symbols.

SOME EXAMPLES

Example A1. A network node 16 configured to communicate with a wireless device 22 (WD 22), the network node 16 configured to, and/or comprising a radio interface 62 and/or comprising processing circuitry 68 configured to:
receive signals, the signals being based at least in part on a transmit timing that is based at least in part on at least one operating characteristic of the wireless device 22 operating within a cell.

Example A2. The network node 16 of Example A1, wherein the at least one operating characteristic includes at least one of a speed of the wireless device 22 and a bandwidth with which the wireless device 22 is operating within the cell.

Example A3. The network node 16 of Example A1, wherein the transmit timing is based at least in part on at least one transmission timing parameter.

Example B1. A method implemented in a network node 16 configured to communicate with a wireless device 22 (WD 22), the method comprising receiving signals, the signals being based at least in part on a transmit timing that is based at least in part on at least one operating characteristic of the wireless device 22 operating within a cell.

Example B2. The method of Example B1, wherein the at least one operating characteristic includes at least one of a speed of the wireless device 22 and a bandwidth with which the wireless device 22 is operating within the cell.

Example B3. The method of Example B1, wherein the transmit timing is based at least in part on at least one transmission timing parameter.

Example C1. A wireless device 22 (WD 22) configured to communicate with a network node, the WD 22 configured to, and/or comprising a radio interface 82 and/or processing circuitry 84 configured to:
determine at least one operating characteristic of the wireless device 22 operating within a cell;
autonomously adjust a transmit timing of the wireless device 22 based at least in part on the at least one operating characteristic; and
optionally cause transmission based at least in part on the autonomously adjusted transmit timing.

Example C2. The WD 22 of Example C1, wherein the at least one operating characteristic includes at least one of a speed of the wireless device 22 and a bandwidth with which the wireless device 22 is operating within the cell.

Example C3. The WD 22 of Example C1, wherein the autonomously adjusted transmit timing is based at least in part on at least one transmission timing parameter.

Example D1. A method implemented in a wireless device 22 (WD 22), the method comprising:
determining at least one operating characteristic of the wireless device 22 operating within a cell;
autonomously adjusting a transmit timing of the wireless device 22 based at least in part on the at least one operating characteristic; and
optionally causing transmission based at least in part on the autonomously adjusted transmit timing.

Example D2. The method of Example D1, wherein the at least one operating characteristic includes at least one of a speed of the wireless device 22 and a bandwidth with which the wireless device 22 is operating within the cell.

Example D3. The method of Example D1, wherein the autonomously adjusted transmit timing is based at least in part on at least one transmission timing parameter.

Example E1. A network node 16 configured to communicate with a wireless device 22 (WD 22), the network node 16 configured to, and/or comprising a radio interface 62 and/or comprising processing circuitry 68 configured to:
determine a high speed indicator associated with at least one operating characteristic of the wireless device 22 operating within a cell;
optionally cause transmission of the high speed indicator to assist the wireless device 22 in adjusting an uplink transmit timing; and
optionally receive signals, from the wireless device 22, having an adjusted transmit timing based at least in part on the high speed indicator.

Example E2. The network node 16 of Example E1, wherein the at least one operating characteristic includes at least one of a speed of the wireless device 22 and a bandwidth with which the wireless device 22 is operating within the cell.

Example E3. The network node 16 of Example E1, wherein the adjusted transmit timing is based at least in part on at least one transmission timing parameter.

Example F1. A method implemented in a network node 16 configured to communicate with a wireless device 22, the method comprising;
- determining a high speed indicator associated with at least one operating characteristic of the wireless device 22 operating within a cell;
- optionally causing transmission of the high speed indicator to assist the wireless device 22 in adjusting an uplink transmit timing; and
- optionally receiving signals, from the wireless device 22, having an adjusted transmit timing based at least in part on the high speed indicator.

Example F2. The method of Example F1, wherein the at least one operating characteristic includes at least one of a speed of the wireless device 22 and a bandwidth with which the wireless device 22 is operating within the cell.

Example F3. The method of Example F1 wherein the adjusted transmit timing is based at least in part on at least one transmission timing parameter.

Example G1. A wireless device 22 (WD 22) configured to communicate with a network node 16, the WD 22 configured to, and/or comprising a radio interface 82 and/or processing circuitry 84 configured to:
- receive a high speed indicator;
- adjust a transmit timing based at least in part on the high speed indicator; and
- optionally transmit signals based at least in part on the adjusted transmit timing.

Example G2. The WD 22 of Example G1, wherein the high speed indicator is associated with at least one operating characteristic of the wireless device 22 operating within a cell.

Example G3. The WD 22 of Example G1, wherein the adjusted transmit timing is based at least in part on at least one transmission timing parameter.

Example H1. A method implemented in a wireless device 22 (WD 22), the method comprising:
- receiving a high speed indicator;
- adjusting a transmit timing based at least in part on the high speed indicator; and
- optionally transmitting signals based at least in part on the adjusted transmit timing.

Example H2. The method of Example H1, wherein the high speed indicator is associated with at least one operating characteristic of the wireless device 22 operating within a cell.

Example H3. The method of Example H1, wherein the adjusted transmit timing is based at least in part on at least one transmission timing parameter.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device, WD, configured to communicate with a network node, the WD comprising:
    processing circuitry configured to:
        obtain speed information about a speed of the WD, and bandwidth information about a bandwidth associated with a cell serving the WD, the speed information indicating that the WD is associated with one of a plurality of speed ranges, each of the plurality of speed ranges having an upper bound and corresponding to at least one transmit timing parameter;
        adjust a transmit timing parameter of the WD based at least on the obtained information; and
        transmit signals based at least on the adjusted transmit timing.

2. The WD of claim 1, wherein the adjusting of the transmit timing includes switching from a first operational scheme to a second operational scheme, each operational scheme defining at least one respective value at least one transmit timing parameter.

3. The WD of claim 2, wherein the first operational scheme is configured to be used by the WD in the absence of reception of the indication that the WD is associated with the one of the plurality of speed ranges.

4. The WD of claim 1, wherein at least one of:
    the bandwidth is one of a bandwidth of the cell, a bandwidth part associated with the WD and a bandwidth of a reference signal; and
    the bandwidth information is determined, explicitly or implicitly, by one or more parameters, the one or more parameters comprising a numerology associated with a cell serving the WD.

5. A method implemented by a wireless device, WD, that is configured to communicate with a network node, the method comprising:
    obtaining speed information about a speed of the WD and bandwidth information about a bandwidth associated with a cell serving the WD, the speed information indicating that the WD is associated with one of a plurality of speed ranges, each of the plurality of speed ranges having an upper bound and corresponding to at least one transmit timing parameter;
    adjusting a transmit timing parameter of the WD based at least on the obtained speed information; and
    transmitting signals based at least on the adjusted transmit timing parameter.

6. The method of claim 5, wherein the adjusting of the transmit timing parameter includes switching from a first operational scheme to a second operational scheme, each operational scheme defining at least one respective value for the transmit timing parameter.

7. The method of claim 6, wherein the first operational scheme is used by the WD in the absence of reception of an indication that the WD is associated with the one of the plurality of speed ranges.

8. The method of claim 5, wherein at least one of:
    the bandwidth is one of a bandwidth of the cell, a bandwidth part associated with the WD and a bandwidth of a reference signal; and
    the bandwidth information is determined, explicitly or implicitly, by one or more parameters, the one or more parameters comprising a numerology associated with a cell serving the WD.

9. A network node configured to communicate with a wireless device, WD, the network node comprising:
    processing circuitry configured to:
        signal an indication to the WD, the indication being associated at least with a speed of the WD and configured to cause the WD to adjust a transmit timing parameter of the WD, the speed with which the indication is associated being one of a plurality of speed ranges, each of the plurality of speed ranges having an upper bound and corresponding to at least one transmit timing parameter; and
        receive signals based at least on the adjusted transmit timing parameter.

10. The network node of claim 9, wherein the processing circuitry is configured to provide the indication by an indicator that includes at least one indicator parameter, the at least one indicator parameter indicating one of a plurality of operational schemes for the WD to implement.

11. A method implemented by a network node that is configured to communicate with a wireless device, WD, the method comprising:
    signaling an indication to the WD, the indication being associated at least with a speed of the WD and configured to cause the WD to adjust a transmit timing parameter of the WD, the speed with which the indication is associated being one of a plurality of speed ranges, each of the plurality of speed ranges having an upper bound and corresponding to at least one transmit timing parameter; and
    receiving signals based at least on the adjusted transmit timing parameter.

12. The method of claim 11, wherein the indication is provided by an indicator that includes at least one indicator parameter, the at least one indicator parameter indicating one of a plurality of operational schemes for the WD to implement.

13. The WD of claim 1, wherein the processing circuitry is configured to obtain at least one of the speed and bandwidth information through reception of an indication from the network node.

14. The WD of claim 1, wherein the speed information at least one of:
    comprises a high speed indicator indicating that the WD speed is equal to or above a certain threshold; and
    is based at least on an estimated speed of the WD, the estimated speed of the WD being based on at least one of:
        a geographical area where the WD is located; and
        historical speed data of the WD.

15. The method of claim 5, wherein at least one of the speed and bandwidth information is obtained through reception of an indication from the network node.

16. The method of claim 5, wherein the speed information at least one of:
   comprises a high speed indicator indicating that the WD speed is equal to or above a certain threshold; and
   is based at least on an estimated speed of the WD, the estimated speed of the WD being based on at least one of:
      a geographical area where the WD is located; and
      historical speed data of the WD.

17. The network node of claim 9, wherein at least one of:
   the indication is provided by a high speed indicator indicating that the WD speed is equal to or above a certain threshold; and
   the speed with which the indication is associated is an estimated speed of the WD, the estimated speed of the WD being based at least on one of:
      a geographical area where the WD is located; and
      historical speed data of the WD.

18. The network node of claim 9, the indication being further associated with a bandwidth associated with a cell serving the WD, wherein at least one of:
   the bandwidth is one of a bandwidth of the cell, a bandwidth part associated with the WD and a bandwidth of a reference signal; and
   the bandwidth is determined, explicitly or implicitly, by one or more parameters, the one or more parameters comprising a numerology associated with a cell serving the WD.

19. The method of claim 11, wherein at least one of:
   the indication is provided by a high speed indicator indicating that the WD speed is equal to or above a certain threshold; and
   the speed with which the indication is associated with is an estimated speed of the WD, the estimated speed of the WD being based at least one one of:
      a geographical area where the WD is located; and
      historical speed data of the WD.

20. The method of claim 11, the indication being associated with a bandwidth associated with a cell serving the WD, wherein at least one of:
   the bandwidth is one of a bandwidth of the cell, a bandwidth part associated with the WD and a bandwidth of a reference signal; and
   the bandwidth is determined, explicitly or implicitly, by one or more parameters, the one or more parameters comprising a numerology associated with a cell serving the WD.

* * * * *